United States Patent [19]
Althausen et al.

[11] Patent Number: 5,637,277
[45] Date of Patent: Jun. 10, 1997

[54] PROCESS AND DEVICE FOR PRODUCING FOAM CASINGS WITH CFC-FREE POLYURETHANE FOAMS

[75] Inventors: Ferdinand Althausen, Neunkirchen-Seelscheid; Helmut Duschanek; Bodo Büchel, both of Königswinter; Kurt Pieper, Troisdorf; Werner Kraft, Bad Honnef, all of Germany

[73] Assignee: Maschinenfabrik Hennecke GmbH, Leverkusen, Germany

[21] Appl. No.: 285,384

[22] Filed: Aug. 2, 1994

[30] Foreign Application Priority Data

Aug. 17, 1993 [DE] Germany .................. 43 27 569.9

[51] Int. Cl.⁶ ........................................... C08F 2/00
[52] U.S. Cl. ................ 422/133; 422/131; 422/224; 264/45.5; 428/542.8
[58] Field of Search ............................ 422/131, 132, 422/133, 224; 428/542.8; 264/45.5, 50, 54

[56] References Cited

U.S. PATENT DOCUMENTS

| | | | |
|---|---|---|---|
| 4,464,320 | 8/1984 | Saidla | 264/45.3 |
| 4,503,014 | 3/1985 | Bauer | 422/135 |
| 4,505,592 | 3/1985 | Ihbe et al. | 366/134 |
| 4,721,391 | 1/1988 | Bauer | 366/171 |
| 4,726,933 | 2/1988 | Mayr et al. | 422/133 |
| 4,824,732 | 4/1989 | Hendry et al. | 428/524.8 |
| 4,990,083 | 2/1991 | Bernhardt | 425/547 |
| 5,071,881 | 12/1991 | Parfondry et al. | 521/51 |
| 5,270,013 | 12/1993 | Decker | 422/133 |

FOREIGN PATENT DOCUMENTS

| | | |
|---|---|---|
| 1778104 | 7/1971 | Germany . |
| 1059302 | 2/1967 | United Kingdom . |

OTHER PUBLICATIONS

Database WPI, Sec. Ch, Wk 9220, AN 92-164622, Hercules Inc., 'Mechanical poppets for inerting and venting closed moulds'—for prodn. of parts by reaction injection moulding and.

Research Disclosure, Bd. 336, Nr. 096 Apr. 10, 1992, Emsworth GB, p. 307, XP305031 Hercules Incorp. 'Mechanical poppets for inerting and venting closed moulds'.

Primary Examiner—Christopher Kim
Attorney, Agent, or Firm—Joseph C. Gil; Lyndanne M. Whalen

[57] ABSTRACT

A process and device for foaming casings, particularly refrigerator casings, with a blowing agent which can form an explosive mixture with atmospheric oxygen during evaporation which reduce the risk of explosion by introducing inert gas into the space in which the foam is to be formed by means of a servo-controlled inlet valve.

7 Claims, 2 Drawing Sheets

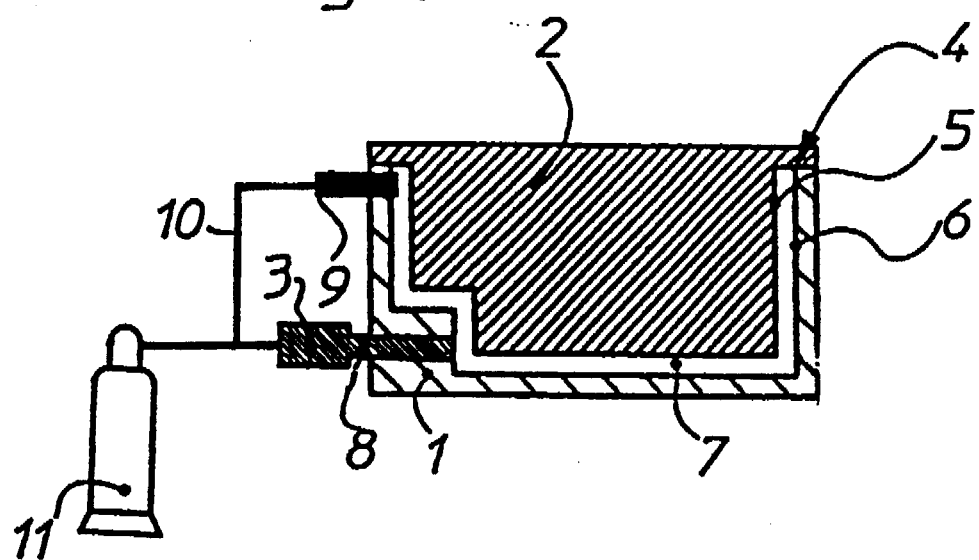

PROCESS AND DEVICE FOR PRODUCING FOAM CASINGS WITH CFC-FREE POLYURETHANE FOAMS

BACKGROUND OF THE INVENTION

The present invention relates to a process and to a device for producing foam casings from CFC-free polyurethane foams made with a blowing agent which in combination with atmospheric oxygen has the potential to form an explosive mixture such as pentane, butane or hexane.

In the production of foam casings, particularly refrigerator casings, blowing agent which is released during foaming inside the casing can form an explosive mixture with the atmospheric oxygen present in the casing. There is a risk that the casing (in the case of refrigerator casings, the so-called "inner liner") can charge with static which can lead to a brush discharge and thus to explosion.

Attempts have been made to make the inner liner electrically conductive by means of a coating to prevent electrostatic charges by grounding. Another possible method for preventing static would be to purge the entire space in which the foam is to be formed with ionized air to break down electrostatic charges. However, each of these methods is quite complicated and expensive.

SUMMARY OF THE INVENTION

It is an object of the present invention to provide a simple and inexpensive solution to the problem of potential explosions encountered with casings formed from non-CFC blown foams.

It is also an object of the present invention to provide a process for foaming casings from reaction mixtures blown with a non-CFC blowing agent with the potential to form an explosive mixture with atmospheric oxygen.

It is another object of the present invention to provide a device which reduces the potential for explosion during the foaming of casings from non-CFC blown foams.

It is a further object of the present invention to provide a process and device for foaming casings, particularly refrigerator casings with inner liners, with non-CFC blowing agents in which the potential for explosion is significantly reduced.

These and other objects which will be apparent to those skilled in the art are accomplished by introducing inert gas into the space to be occupied by the foam casing prior to introduction of the foam-forming mixture. The inert gas is introduced by means of a servo-controlled inlet valve.

BRIEF DESCRIPTION OF THE DRAWINGS

FIG. 7 illustrates an alternative arrangement of the device shown in FIG. 1.

DETAILED DESCRIPTION OF THE INVENTION

Figure 1:
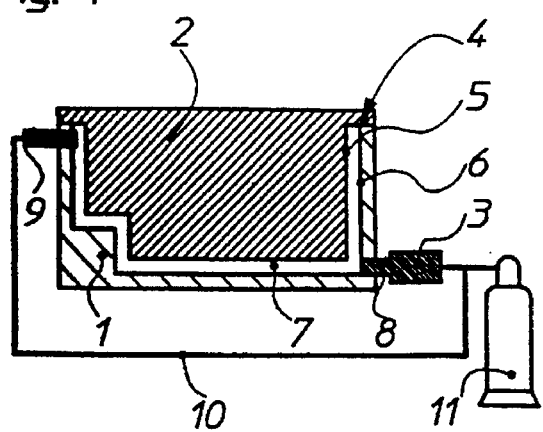
FIG. 1 illustrates a device for foaming a refrigerator casing with the door opening at the top.

The present invention relates to a process for producing foam casings from foam-forming mixtures in which the blowing agent is not a chlorofluorocarbon (CFC). This process is particularly useful when the blowing agent used to produce the foam is one which is potentially explosive when mixed with atmospheric oxygen. In the process of the present invention, an inert gas (e.g., nitrogen) is introduced into the space in the mold in which the foam is to be formed before any of the foam-forming mixture has been introduced. Blowing agent released during foaming is not ignitable due to the presence of the inert gas.

The present invention also relates to a device for producing foam casings from foam-forming mixtures in which the blowing agent is not a CFC. A key feature of this device is the use of a servo-controlled inlet valve to introduce inert gas into the space of a mold in which foam is to be formed.

For even greater safety, it is preferred that the inert gas be introduced into the space in which the foam is to be formed after the introduction of the reaction mixture until the foam has risen to the point of entry (i.e., the point of the space in which the foam is to be formed at which the inlet nozzle for the inert gas is located).

By introducing inert gas during and after the introduction of the foam-forming reaction mixture, the space in which the foam is to be formed is rinsed. This rinsing eliminates the formation of an ignitable concentration of the blowing agent as that blowing agent is being released during foam formation.

The inert gas in the space to be foamed is at approximately atmospheric pressure, eventually slightly above atmospheric pressure, to maintain the flow of inert gas.

Advantageously, the inert gas is introduced at the highest point of the space in which foam is to be formed because inert gas can be introduced for as long as possible.

The device of the present invention includes a servo-controlled inlet valve, a supporting mold and a mixhead. A unique feature of this device is the use of a servo-controlled inlet valve for inert gas at a position which opens into the space in which foam is to be formed. The inlet valve may be arranged on the mixhead or, alternatively, on the supporting mold. It is preferred that the inlet valve be arranged at the highest point of the space in which the foam is to be formed. It is also preferred that at least two inlet valves be included in the device of the present invention. The use of multiple inlet valves makes it possible to arrange one or more inlet valves on the mixhead and one or more inlet valves on the supporting mold at different heights.

The introduction of inert gas into the mixing chamber of a mixhead is disclosed in EP 0,196,345-B1. In the disclosed process, the inert gas is intended to immediately fill the cells of the foam and to prevent the cell walls from shrinking. That is, the inert gas is intended to become deposited in the foam. Accordingly, the inert gas is introduced during the shot of foam-forming mixture into the mold. This disclosure does not, however, address the foaming of casings such as those produced in the present invention. The problems caused by electrical charges in processes such as those of the present invention are not discussed in EP 0,196,345-B1.

Two embodiments of the device of the present invention are illustrated schematically, in FIGS. 1 through 7 which are described in greater detail below.

The device illustrated in FIGS. 1 and 7 is made up of a supporting mold 1 with a core 2 and a mixhead 3. In supporting mold 1 is located a refrigerator casing 4 which is made up of an inner liner 5 and an outer liner 6, between which there is a space 7 in which the foam is to be formed. The mixhead 3 may be any conventional device such as a conventional ejector rod mixing head. In the device illustrated in FIG. 1, mixhead 3 is combined with an inert gas inlet nozzle 8 as represented in greater detail in FIGS. 3 and 4. Another inlet nozzle 9 for inert gas (of the same design as inlet nozzle 8) opens into the uppermost region of space 7. The two inlet nozzles 8 and 9 are connected to an inert gas source 11 via a line 10.

Figure 2:
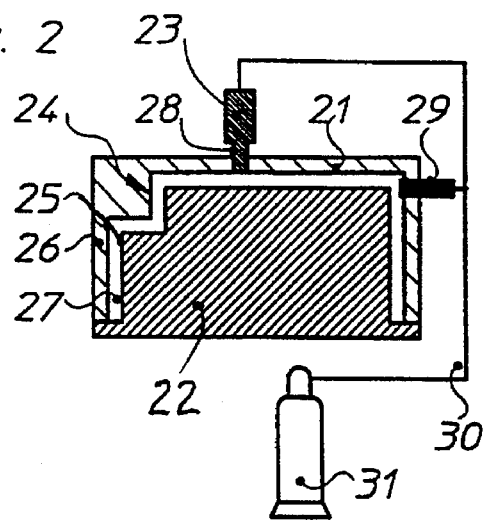
FIG. 2 illustrates a device for foaming a refrigerator casing with the door opening at the bottom.

In FIG. 2, the illustrated device is made up of a supporting mold 21 with core 22 and a mixhead 23. A refrigerator casing 24 is located in supporting mold 21. Refrigerator casing 24 is made up of an inner liner 25 and an outer liner 26. The space 27 located between liners 25 and 26 is the space in which the foam is to be formed. The mixhead 23 may be any conventional mixhead device such as a conventional ejector rod mixing head. Mixhead 23 is combined with an inert gas inlet nozzle 28 which is illustrated in greater detail in FIGS. 5 and 6. Another inlet nozzle 29 (of the same design as nozzle 28) also opens into the upper region of the space 27. The two inlet nozzles 28 and 29 are connected to an inert gas source 31 via a line 30.

Figure 3:
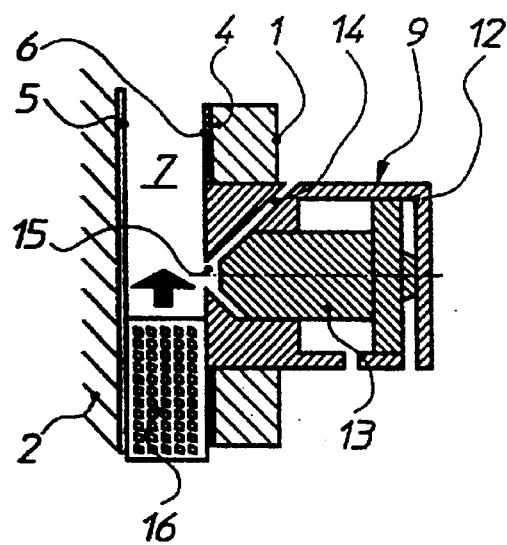
FIG. 3 illustrates an inlet nozzle in the open position.
Figure 4:
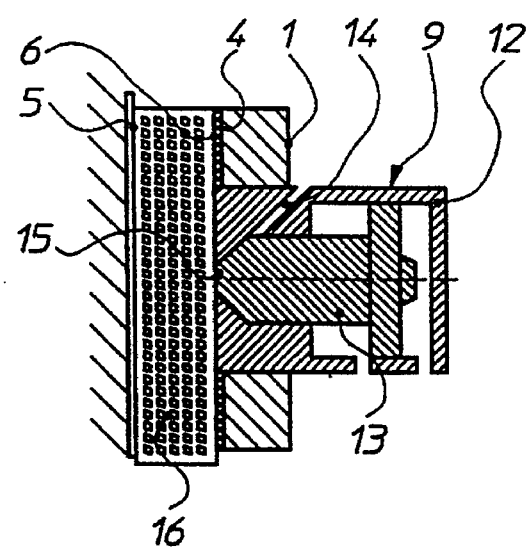
FIG. 4 illustrates the inlet nozzle of FIG. 3 in the closed position.

In FIGS. 3 and 4, inlet nozzle 9 is made up of a casing 12 having a hydraulically controllable valve pin 13 which closes in the discharge direction, an admission channel 14 and a nozzle aperture 15. The nozzle aperture 15 lies in the wall of supporting mold 1 and opens into space 7 in which foam is to be formed into the refrigerator casing 4 which is made up of inner liner 5 and outer liner 6 and supported by casing 2. In FIG. 3, the valve pin 13 is in the open position and the developing foam 16 is foamed in the space 7 to just below the nozzle aperture 15. FIG. 4 shows the inlet nozzle 9 in the closed position and the space 7 filled with foam 16.

Figure 5:
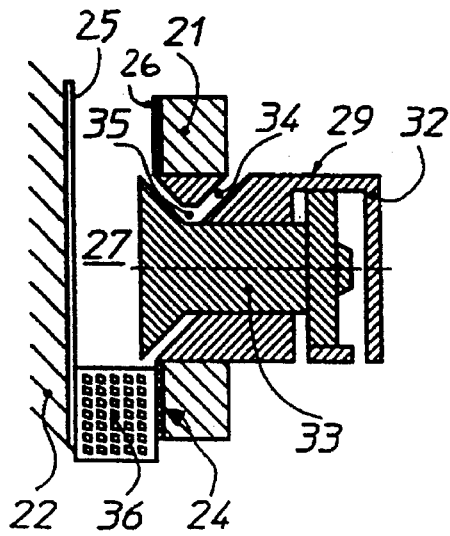
FIG. 5 illustrates a second embodiment of an inlet nozzle in the open position.
Figure 6:
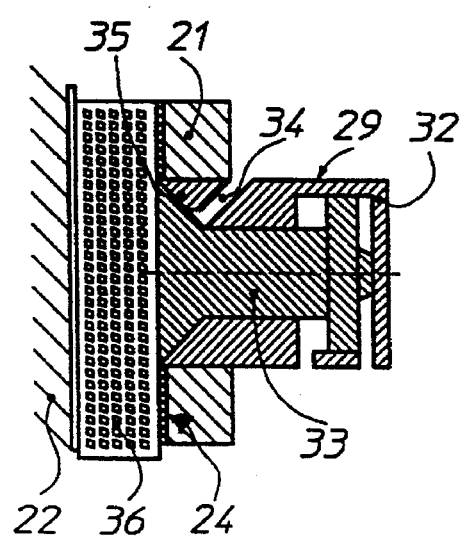
FIG. 6 illustrates the inlet nozzle of FIG. 5 in the closed position.

In FIGS. 5 and 6, the inlet nozzle 29 is made up of a casing 32 having a hydraulically controllable valve pin 33 which opens in the discharge direction, an admission channel 34 and a nozzle aperture 35. The nozzle aperture 35 lies in the wall of supporting mold 21 and opens into the space 27 in which the refrigerator casing 24 is to be foamed. Refrigerator casing 24 is supported by core 22 and is made up of inner liner 25 and outer liner 26. In FIG. 5, valve pin 33 is in the open position and the developing foam 36 is foamed in the space 27 to just below the nozzle aperture 35. FIG. 6 shows the inlet nozzle 29 in the closed position and the space 27 filled with foam 36.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device for foaming casings which is made up of
   a) a supporting mold with a space into which foam-forming materials are introduced during the foaming process,
   b) a mixhead positioned so that foam-forming materials present therein are introduced into the space of the mold a) during the foaming process,
   and
   c) a servo-controlled inlet valve means for admitting inert gas into the space in the mold a) prior to introduction of foam-forming materials at a position which opens into the space of supporting the mold a).

2. The device of claim 1 in which inlet valve c) is located at a point which is above the point of the space in the mold where foam-forming materials are introduced.

3. The device of claim 2 in which inlet valve c) is located on mixhead b).

4. The device of claim 2 in which inlet valve c) is located on supporting mold a).

5. The device of claim 1 in which inlet valve c) is located on mixhead b).

6. The device of claim 1 in which inlet valve c) is located on supporting mold a).

7. The device of claim 1 in which at least two inlet valves c) are present.

* * * * *